United States Patent
Hariharan et al.

(10) Patent No.: US 10,868,717 B2
(45) Date of Patent: Dec. 15, 2020

(54) CONCURRENT PROFILE DEPLOYMENTS

(71) Applicant: Hewlett Packard Enterprise Development LP, Houston, TX (US)

(72) Inventors: Shankaranarayanan Hariharan, Bangalore (IN); Michelle Catherine Frolik, Spring, TX (US); Keith L. Kelley, Houston, TX (US); Billy S. Little, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/264,234

(22) Filed: Jan. 31, 2019

(65) Prior Publication Data
US 2020/0252272 A1 Aug. 6, 2020

(51) Int. Cl.
*H04L 12/24* (2006.01)

(52) U.S. Cl.
CPC ...... *H04L 41/0806* (2013.01); *H04L 41/0843* (2013.01)

(58) Field of Classification Search
CPC .................................................. H04L 41/0806
USPC ......................................................... 709/222
See application file for complete search history.

(56) References Cited

U.S. PATENT DOCUMENTS

| | | | |
|---|---|---|---|
| 7,013,331 B2 * | 3/2006 | Das .......................... | H04L 29/06 709/220 |
| 7,360,025 B1 * | 4/2008 | O'Connell .......... | G06F 16/9574 711/133 |
| 7,640,533 B1 * | 12/2009 | Lottero ..................... | G06F 8/71 717/108 |
| 7,926,051 B2 | 4/2011 | Barta et al. | |
| 7,933,231 B1 * | 4/2011 | Huang ................ | H04L 41/0806 370/312 |
| 8,201,166 B2 | 6/2012 | Garrett et al. | |
| 8,234,650 B1 * | 7/2012 | Eppstein ................ | G06F 9/5072 709/220 |
| 8,516,464 B2 | 8/2013 | Harrop et al. | |
| 9,645,814 B1 * | 5/2017 | Roque ....................... | G06F 8/71 |
| 9,654,599 B1 | 5/2017 | Wheeler et al. | |
| 10,146,885 B1 * | 12/2018 | Totale ....................... | G06F 8/71 |
| 2004/0204778 A1 * | 10/2004 | Lalapeth ............. | H04L 41/0213 700/83 |
| 2006/0010233 A1 * | 1/2006 | Fellenstein ......... | G06F 11/3414 709/224 |

(Continued)

OTHER PUBLICATIONS

Lenovo Files; "Installing operating systems on bare-metal servers"; 5 pages; printed on Jul. 31, 2018 from webpage: http://sysmgt.lenovofiles.com/help/index/jsp?topic=%2Fcom.lenovo.lxca.doc%2Fcomputenode image deployment.html.

*Primary Examiner* — Ondrej C Vostal
(74) *Attorney, Agent, or Firm* — Brooks, Cameron & Huebsch, PLLC

(57) ABSTRACT

An example system including a processing resource and a memory resource. The memory resource may store machine-readable instructions to cause the processing resource to, resolve dependencies between a plurality of portions of a configuration profile prior to a deployment of the configuration profile to configure a computing resource; and concurrently process the plurality of portions of the configuration profile to configure a plurality of components of the computing resource according to corresponding portions of the plurality of portions of the configuration profile.

14 Claims, 5 Drawing Sheets

(56) References Cited

U.S. PATENT DOCUMENTS

| | | | |
|---|---|---|---|
| 2008/0072219 A1* | 3/2008 | Kabadiyski | G06F 8/60 717/175 |
| 2008/0109542 A1* | 5/2008 | Ferri | G06F 8/60 709/222 |
| 2008/0172366 A1* | 7/2008 | Hannel | H04L 63/0272 |
| 2009/0106011 A1* | 4/2009 | Chen | G06F 8/10 703/17 |
| 2011/0307907 A1* | 12/2011 | Hwang | G06F 3/1204 719/327 |
| 2012/0054727 A1* | 3/2012 | Joukov | G06F 9/44505 717/168 |
| 2012/0233625 A1* | 9/2012 | Sabin | G06F 9/5072 718/105 |
| 2014/0259169 A1* | 9/2014 | Harrison | G06F 21/554 726/23 |
| 2014/0289722 A1 | 9/2014 | Hoy et al. | |
| 2015/0081858 A1* | 3/2015 | Gel | G06F 8/64 709/221 |
| 2015/0089505 A1* | 3/2015 | Malaiyandisamy | G06F 9/5072 718/101 |
| 2016/0149761 A1* | 5/2016 | Liu | H04L 41/0889 709/221 |
| 2016/0249186 A1* | 8/2016 | Dumov | H04W 12/04 |
| 2017/0139741 A1* | 5/2017 | Bachelor | G06N 3/02 |
| 2017/0249134 A1* | 8/2017 | Grover | G06F 8/65 |
| 2018/0048532 A1* | 2/2018 | Poort | H04L 67/10 |
| 2018/0205616 A1* | 7/2018 | Liu | H04L 41/5045 |
| 2018/0324046 A1* | 11/2018 | Lowry | H04L 41/0873 |
| 2019/0303213 A1* | 10/2019 | Chaganti | G06F 16/9024 |
| 2019/0361800 A1* | 11/2019 | Parees | G06F 8/20 |

* cited by examiner

CONCURRENT PROFILE DEPLOYMENTS

BACKGROUND

A data center may include a pool of computing infrastructure. For example, a data center may include computing resources such as computing devices, servers, cooling devices, power supply and management devices, local disks, enclosures, storage systems, storage area networks (SANs), networks, networking interconnects, network fabric, storage fabric, etc. In some examples, management of data center infrastructure may include virtualizing access to computing resource. Virtualization of the data center computing resources may include composing software-defined virtual resource pools that may be provisioned to execute various workloads. In some examples, virtualization of data center computing resource may be accomplished by deploying a profile to the computing resource to configure the computing resource settings such that the computing resource may be utilized to execute a workload.

DETAILED DESCRIPTION

Figure 1:
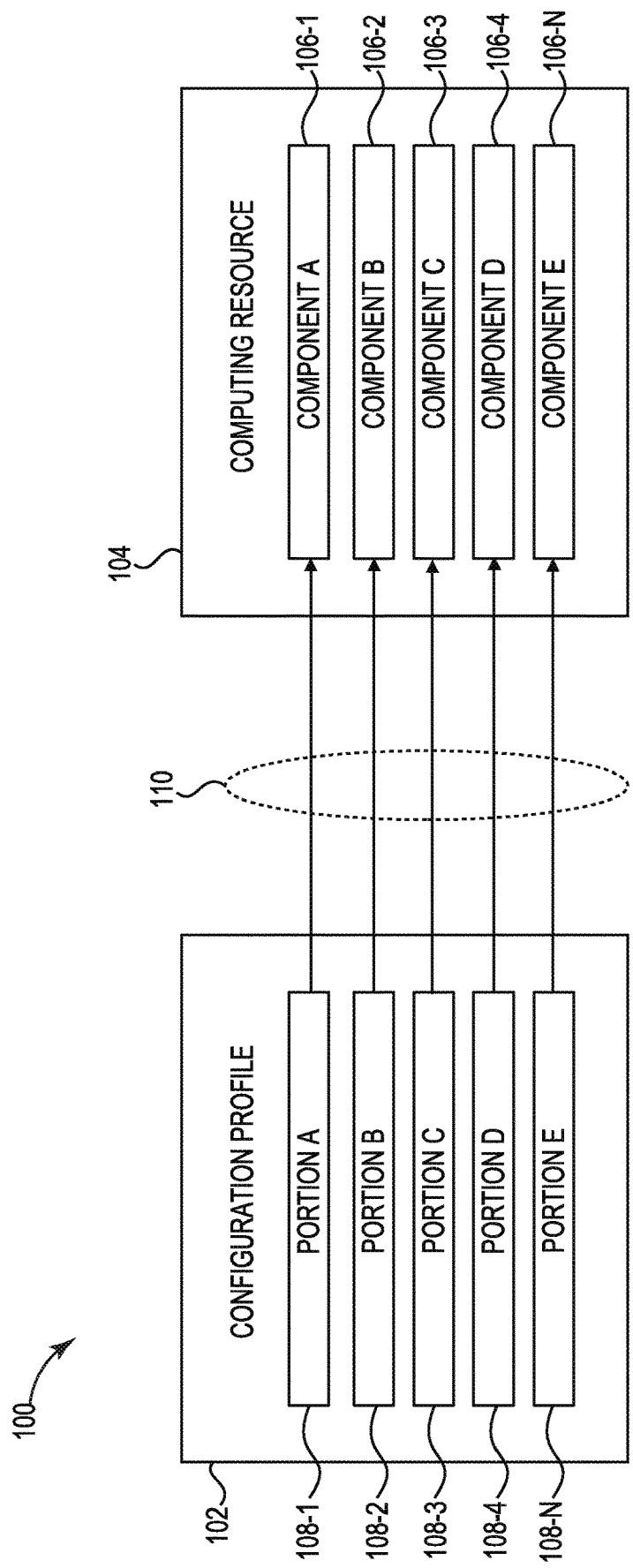
FIG. 1 illustrates an example of a system of concurrent server profile deployments consistent with the present disclosure.

Server virtualization may include configuration of a computing resource. For example, networking, shared storage, a storage area network (SAN) storage, operating system deployment, boot, etc. may be configured to virtualize the computing resource.

In some examples, a computing resource of a data center may include a bare metal server. In order to launch a workload for execution to the server, the server may first be configured to be accessible to execute the workload. In some examples, the networking, shared storage, SAN storage, operating system deployment, boot, etc. of the server may be configured.

Configuration of a data center resource such as a server may be accomplished via the deployment of a profile to the server. For example, a profile, such as a server profile, may specify configurations to be applied to the server to prepare the server for operation as a virtualized component of a data center's composable infrastructure ready to execute workloads.

In some examples, a profile may include a template or model that is configurable and/or deployable to data center computing resources to configure them in a manner that provisions them to execute a workload. The profile may be constructed of a plurality of portions or sections. The portions may be specific to a subset of configurations to be deployed to the computing resource.

For example, a profile may include a portion that specifies networking configurations, or profile options, to be deployed to the server. Another portion of the profile may specify SAN storage configurations to be deployed to the server. Another portion of the profile may specify shared storage configurations to be deployed to the server. Another portion of the profile may specify operating system configurations to be deployed to be deployed to the server. Another portion of the profile may specify server boot configurations to be deployed to the server. Other portions of the profile may specify other configurations to be deployed to the server.

Deploying profiles to a computing device such as a server occurs over a period of time. During this period of time that the computing device is being configured according to the profile it may not be available to execute workloads. That is, a server may not be ready for use until the configuration process completes. Configuring each profile option may involve configuring over a period of time that contributes to the overall downtime of the server.

Profile deployments may be accomplished through the sequential deployment of each profile option to the computing device being configured. For example, in deploying a profile to a bare metal server, each configuration specified in the profile may be performed sequentially at the server. In an example, an operating system configuration portion of the profile may be deployed to the server first, followed by a shared storage configuration portion, followed by a network connection configuration portion, followed by a SAN configuration portion, followed by other portions.

Accordingly, the computing device being configured may be unavailable to execute workloads and/or be down for configuration for an amount of time that is equal to the amount of time that it takes to sequentially deploy each of the profile options in each of the profile portions to the computing device. For example, if a profile specifies X network connections to be configured at the server for the network configuration portion and each connection takes T seconds to configure, then the deployment of the subsequent profile portion would be delayed for X×T seconds while the network connection configuration is deployed. As such, the deployment of the profile, and therefore the downtime of the server in being configured, is directly determined by the time to complete deployment of each of the profile options in isolation and sequentially. As such, each profile option deployed has an additive effect to the overall downtime of the server for such configurations.

In enterprise settings, seconds of delay in server availability for composable infrastructure may come at a performance cost, a satisfaction cost, and/or a monetary cost. Further, data center infrastructure may be vast and include numerous computing device components to be configured. As such, the scale of any incremental delay in deploying profiles to servers for provisioning may be equally large and proportionally costly.

In contrast, examples consistent with the present disclosure may include a mechanism to speed up deployment of a profile to a computing device such as a server. Examples may include eliminating the sequential deployment of profile options to a server. For example, an example consistent with the present disclosure may include a system comprising a processor a memory resource storing machine-readable instructions to cause the processing resource to resolve dependencies between a plurality of portions of a server profile prior to a deployment of the server profile to configure a server; and concurrently process the plurality of portions of the server profile to configure a plurality of components of the server according to corresponding portions of the plurality of portions of the server profile.

FIG. 1 illustrates an example of a system 100 of concurrent configuration profile deployments consistent with the present disclosure. The system 100 may be implemented by components of and/or include functionalities of the system 200, the data center management device 320, the non-transitory memory 440 and/or the method 560 described in FIGS. 2, 3, 4, and 5.

The system may include a configuration profile 102. The configuration profile 102 may include a logical construct that is configurable to specify a target configuration of data center infrastructure. For example, the configuration profile 102 may specify definitions of configuration settings applicable to a computing resource 104 of the data center infrastructure. In some examples, the computing resource 104 may include a bare metal server, external storage, networking components, a virtualized construct such as a virtual machine, etc.

The configuration profile 102 may be created from a group of template profiles that may be modifiable. The configuration profile 102 may be reusable. The configuration profile 102 may be applied to more than one computing resource 104. For examples, the configuration profile 102 may be simultaneously applicable and/or simultaneously deployed to a group of computing resources in the data center infrastructure.

As described above, the configuration profile 102 may include definitions of profile options to configure the computing resource 104. The profile options may specify configurations to be deployed to the computing resource 104 in order to prepare the computing resource 104 for virtualization and execution of application workloads. The profile options may define the specific configuration settings to be applied to each of a plurality of components 106-1 . . . 106-N of the computing resource 104.

The computing resource 104 may include a collection of components 106-1 . . . 106-N that are physical and/or logical components of a physically and/or logically defined computing resource 104 of data center infrastructure. For example, the components 106-1 . . . 106-N may include components of a bare metal server that may be configured in order to virtualize the server. The computing resource 104 may include, for example, a server being configured for virtualization and/or provisioning in a composable data center infrastructure. The computing resource 104 may be a server being configured to become a virtualized resource in a data center infrastructure.

As described above, the computing resource 104 may include a plurality of components 106-1 . . . 106-N. The components 106-1 . . . 106-N may include physical and/or logical resources of the computing resource 104. The components 106-1 . . . 106-N may be broadly categorized into groups of such resources. For example, the components 106-1 . . . 106-N may include a group including firmware components of the computing resource 104, a group including Basic Input/Output System (BIOS) components of the computing resource 104, a group including shared storage components of the computing resource 104, a group including SAN storage components of the server 104, a group including network connectivity components of the computing resource 104, a group including operating system components of the server. That is, the components 106-1 . . . 106-N may include physical and or logical components of the computing resource 104 which, once configured, allow the computing resource to perform the aforementioned associated functionalities.

The profile options of the configuration profile 102 may be grouped into portions 108-1 . . . 108-N. The portions 108-1 . . . 108-N may correspond to the computing resource components 106-1 . . . 106-N of the computing resource 104 for which they define configuration settings and/or the type of configuration settings that they define. The portions 108-1 . . . 108-N may be organized as architecturally separate portions of the configuration profile 102. Alternatively, the separate portions 108-1 . . . 108-N may not be organized as architecturally separate components but may be conceptually (e.g., by type, by function, by computing resource component 106-1 . . . 106-N being configured, etc.) separate portions of the configuration profile 102.

Examples of a configuration profile portion 108-1 . . . 108-N may include a firmware configuration portion including profile options for configuring computing resource 104 firmware, a BIOS portion including profile options for configuring computing resource 104 BIOS settings, a shared storage portion including profile options for configuring computing resource 104 shared storage, a SAN storage portion including profile options for configuring computing resource 104 SAN storage, a network connectivity portion including profile options for configuring computing resource 104 network connectivity, an operating system deployment portion include profile options for configuring a computing resource 104 operating system, and/or an other portion including profile options for configuring computing resource 104 components 106-1 . . . 106-N outside of the components 106-1 . . . 106-N configured by the remaining portions 108-1 . . . 108-N of the configuration profile 102.

The configuration profile 102 may be arranged in a way that suggests and/or directly specifies an intended order or schedule for the deployment of the portions 108-1 . . . 108-N and/or their constituent profile options. In some examples, the configuration profile 102 may specify a sequential order for the deployment of the portions 108-1 . . . 108-N. The configuration profile 102 may specify that each of the profile options and/or portions 108-1 . . . 108-N are to be deployed in isolation and/or in sequence. In other examples, the configuration profile 102 may be deployment sequence agnostic.

When the configuration profile 102 is requested to be deployed to configure a computing resource 104, the request to deploy and/or the portions 108-1 . . . 108-N of the requested computing profile 102 may be parsed. In parsing the request and/or the configuration profile 102, a trace may be performed on each of the profile options specified in the portions 108-1 . . . 108-N listed in the configuration profile 102. The trace may be utilized to identify dependencies existing between the profile options and/or the portions 108-1 . . . 108-N specified in the configuration profile 102.

Some of the profile options and/or the portions 108-1 . . . 108-N specified in the configuration profile 102 may share dependencies. That is, a particular profile option listed in a portion 108-1 . . . 108-N of the configuration profile 102 may rely on the completion of a deployment of another profile option listed in a portion 108-1 . . . 108-N of the configuration profile 102. For example, in order to configure a first component (e.g., 106-1) of the computing resource 104, a server network connection may need to be reserved during configuration of a second component (e.g., 106-2) ahead of time because the first component will need the connection information reserved during deployment of the second component in order to complete configuration of the first component. That is, a dependency may include a utilization of data resulting from a completed configuration of a first component of the computing resource 104, corresponding to a first portion (e.g., 108-1) of the plurality of portions 108-1 . . . 108-N of the configuration profile 102, to perform a configuration of a second component of the computing resource 104, corresponding to a second portion (e.g., 108-2) of the plurality of portions 108-1 . . . 108-N of the configuration profile 102.

Upon identifying dependencies between profile options specified in the portions 108-1 . . . 108-N of the configuration profile 102, the dependencies may be resolved between the profile options and/or the portions 108-1 . . . 108-N. Specifically, the dependencies may be resolved between the profile options and/or the portions 108-1 . . . 108-N prior to deployment of the server profile 102 to the server 104.

Resolving a dependency may include restructuring a deployment schedule. For example, a deployment schedule specified by a request to deploy a configuration profile 102 may be restructured to resolve a dependency. The deployment schedule may include a specified order by which to deploy profile options and/or profile portions 108-1 . . . 108-N to the server. The deployment schedule may be specified by an order of instructions (e.g., the corresponding instructions to deploy each profile option or profile portion 108-1 . . . 108-N to a computing resource 104) specified in the request and/or the configuration profile 102.

Restructuring the deployment schedule may include extracting and/or moving instructions and/or code around within the request to deploy and/or within a requested configuration profile 102 to resolve the identified dependencies. That is, the deployment schedule may be modified by modifying the instructions of the request to deploy and/or a requested configuration profile 102. In some examples, a new deployment schedule may be generated from the old deployment schedule, the request for deployment, and/or the configuration profile 102 by structuring the instructions within the new deployment schedule such that the deployment of the profile options and/or the portions 108-1 . . . 108-N specified in the configuration profile 102 happens according to a schedule that will resolve the identified dependencies. In some example, a de novo deployment schedule may be generated directly from the parsed configuration profile 102 and/or the dependencies identified therein.

Resolving the dependencies by restructuring the instructions may include modifying the instructions of the configuration profile 102 such that dependent profile options are placed in a sequence that allows for successful and/or complete configuration of the computing resource 104. For example, in order to configure the computing resource 104 with a first profile option from a first portion of the configuration profile 108-1, data from the deployment of a second profile option from a second portion of the configuration profile 108-2 may be needed as an input. If so, then by performing an extraction of instructions to deploy the second profile option from the second portion of the configuration profile 102 and moving those instructions such that they are deployed to the computing resource 104 prior to the deployment of the first portion of the configuration profile 108-1, the dependency may be resolved. In this manner, the data generated by the deployment of the second profile option of the second portion of the configuration profile 102 to the server 104 may be provided to the first profile option of the first portion of the configuration profile 102 prior to its deployment to the computing resource 104.

Each of the dependencies identified from the request may be resolved similarly. For example, by rearranging the instructions for the profile options that are to be completed prior to the dependent profile options, the profile options to be completed prior to the dependent profile options may be deployed to the computing resource 104 before deployment of the dependent profile option.

Further, the identified dependencies may be resolved by a reservation system. For example, a reliant profile option and/or portion 108-1 . . . 108-N may rely on utilization of a resource of the computing resource 104. In a fully sequential execution of an entire configuration profile 102, assignment of the resource of the computing resource 104 may occur prior to the deployment of the reliant profile option and/or portion 108-1 . . . 108-N. As such, the resource that is the subject of the earlier assignment in the sequential execution may be reserved for future use by the reliant profile option and/or portion 108-1 . . . 108-N without full sequential deployment. That is, by utilizing a reservation system prior to a concurrent deployment of profile options and/or portions 108-1 . . . 108-N the dependency on the profile option and/or portion 108-1 . . . 108-N that would produce the assignment in the sequential reservation is obviated. As such, restructuring the instructions of the configuration profile 102 and/or the deployment schedule may include moving the order of and/or introducing instructions to reserve a resource of the computing resource 104 for utilization in configuring a component 106-1 . . . 106-N by a later deployment of a previously dependent profile option. By providing the identity of the reserved resource to be utilized in configuring that component prior to the deployment of the profile option and/or portion 108-1 . . . 108-N which will configure the component, dependencies are removed. An example of one such resource that may be reserved is a world-wide port name at the computing resource 104 which may be reserved for use by a subsequently configured component 106-1 . . . 106-N of the computing resource 104.

The system 100 may speed up configuration profile 102 deployments by leveraging the early resolution of the dependencies within the configuration profile 102 to perform a concurrent deployment 110 of the configuration profile options and/or portions 108-1 . . . 108-N of the configuration profile 102 having their dependencies already resolved. That is, by restructuring the instructions for deployment of the configuration profile 102 to the computing resource 104, the system 100 will have resolved the dependent relationships between particular portions 108-1 . . . 108-N of the configuration profile 102 such that the data that some portions of the configuration profile 102 rely on is generated prior to the deployment of those dependent portions. The remaining portions of the configuration profile 102 either will have not have had dependencies or they will have had a dependency which has been previously resolved through an earlier deployment of the profile option whose deployment supplies the data upon which the dependent portion 108-1 . . . 108-N relies. As such, the plurality of portions 108-1 . . . 108-N of the configuration profile 102 may be dependency-free and may be concurrently processed or concurrently deployed 110 to configure a corresponding plurality of components 106-1 . . . 106-N of the computing resource 104.

Concurrent processing or concurrent deployment 110 of the profile options and/or portions 108-1 . . . 108-N of the configuration profile 102 may include substantially simultaneous processing of each of the profile options and/or portions 108-1 . . . 108-N of the configuration profile 102 to effectuate the substantially simultaneous configuration of the computing resource 104 components 106-1 . . . 106-N. For example, each of the profile options and/or portions 108-1 . . . 108-N may be placed in separate execution worker queues to be simultaneously processed to configure the corresponding computing resource 104 components 106-1 . . . 106-N. Utilizing this mechanism, the time involved in deploying the entire configuration profile 102 to the computing resource 104 may be shrunk down from the sum of the time to complete deployment of each of the profile options and/or portions 108-1 . . . 108-N in isolation and sequentially, to the time to complete only the longest profile option and/or portion 108-1 . . . 108-N deployment since they are all being deployed simultaneously.

As described above, restructuring the instructions for the deployment schedule to resolve dependencies may include moving profile options and/or portions 108-1 . . . 108-N of the configuration profile 102 whose deployment produces data that other profile options and/or portions 108-1 . . . 108-N of the configuration profile 102 depend on. These data producing profile options may be moved so that they occur prior to the deployment of the dependent profile options and/or portions 108-1 . . . 108-N of the configuration profile 102 which rely on the produced data to complete their deployment. In some examples, this may include moving profile options and/or portions 108-1 . . . 108-N of the configuration profile 102 whose deployment produced data that other profile options and/or portions 108-1 . . . 108-N of the configuration profile 102 depend on such that they occur prior to the concurrent deployment 110 of the remaining profile options and/or portions 108-1 . . . 108-N of the configuration profile 102 which includes the dependent other profile options and/or portions 108-1 . . . 108-N of the configuration profile 102.

Additionally, restructuring the instructions for the deployment schedule to resolve dependencies may include bundling a plurality of profile options and/or portions 108-1 . . . 108-N of the configuration profile 102 whose deployment produces data that a plurality of other profile options and/or portions 108-1 . . . 108-N of the configuration profile 102 depend on. By bundling the profile options that produce the data, they may be concurrently deployed. That is, profile options and/or portions 108-1 . . . 108-N of the configuration profile 102 that produce data depended on by other profile options and/or portions 108-1 . . . 108-N of the configuration profile 102 may be concurrently deployed prior to the concurrent deployment 110 of the dependent profile options and/or portions 108-1 . . . 108-N of the configuration profile 102. Likewise, profile options and/or portions 108-1 . . . 108-N of the configuration profile 102 that rely on deployment of a plurality of other profile options and/or portions 108-1 . . . 108-N of the configuration profile 102 may be deployed concurrently after the concurrent deployment of plurality of other profile options and/or portions 108-1 . . . 108-N of the configuration profile 102. For example, a boot source configuration that occurs on the computing resource after it is powered up following deployment of the other profile options to make sure that everything was configured correctly, may be deployed concurrently after the concurrent deployment of plurality of other profile options and/or portions 108-1 . . . 108-N of the configuration profile 102.

Figure 2:
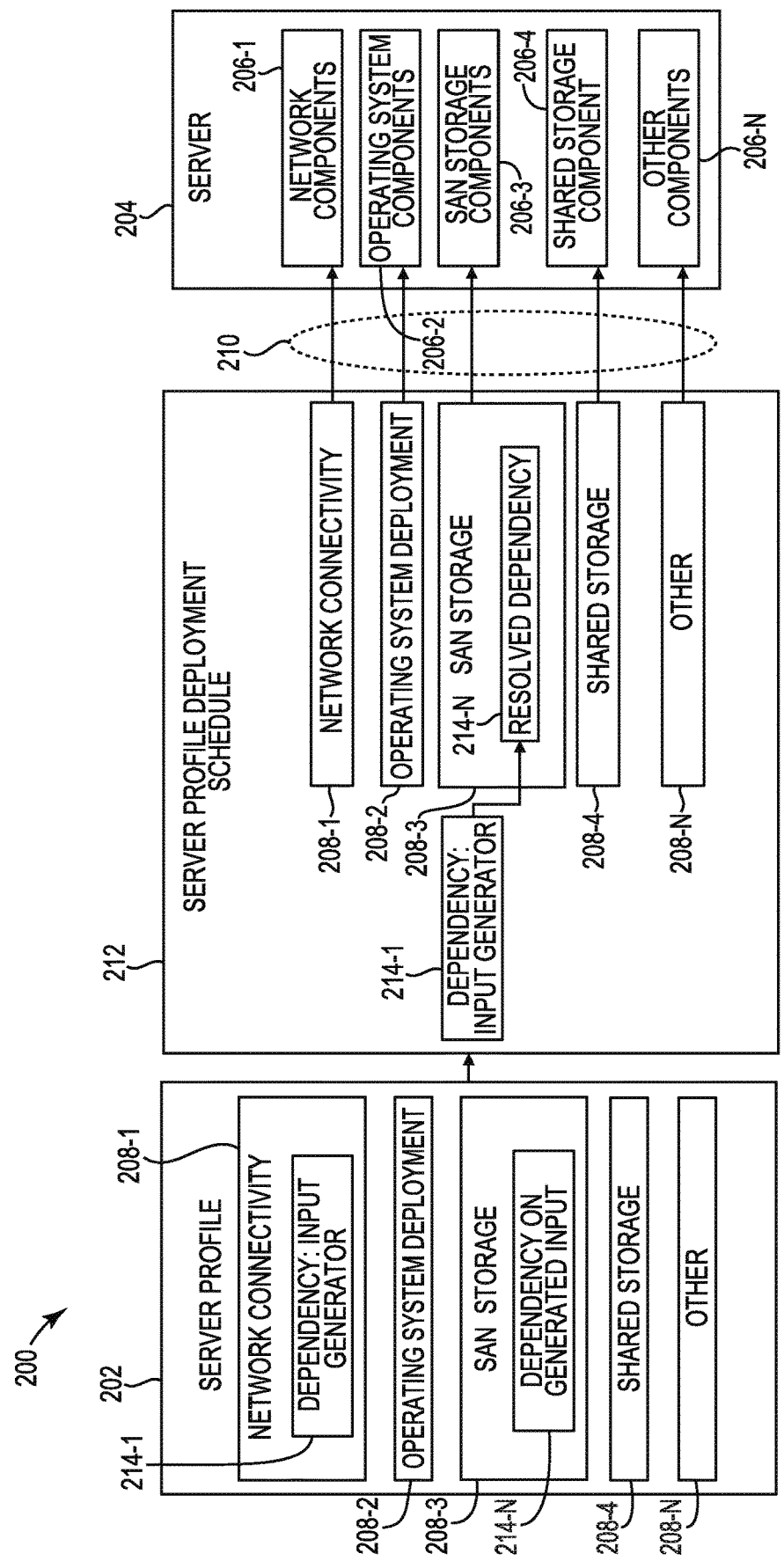
FIG. 2 illustrates an example of a system of concurrent server profile deployments consistent with the present disclosure.

FIG. 2 illustrates an example of a system 200 of concurrent profile deployments consistent with the present disclosure. The system 200 may be implemented by components of and/or include functionalities of the system 100, the data center management device 320, the non-transitory memory 440 and/or the method 560 described in FIGS. 1, 3, 4, and 5.

The system 200 may include a configuration profile. For example, the configuration profile may include a server configuration profile 202. The server profile 202 may include a plurality of profile options. The profile options may include definitions of configurations to be applied to components 206-1 . . . 206-N in order to virtualize a server 204. The components 206-1 . . . 206-N may include components of a server and/or components that are associated with a server and/or are utilized to virtualize the server 204.

The profile options or configurations may be organized into portions 208-1 . . . 208-N. Each portion 208-1 . . . 208-N may include a plurality of server profile options defining configurations to be applied to components 206-1 . . . 206-N to virtualize the server 204. The portions 208-1 . . . 208-N may include categories of configurations. For example, a first portion 208-1 of the server profile 202 may include a network connectivity portion 208-1. The network connectivity portion 208-1 may include profile options for configuring connections of the server 204, such as network connections. The network connectivity portion 208-1 may include profile options for configuring switch downlinks that go to the server 204 hardware, such as instructions for switch management components that configure downlinks on the top of a rack switch. The network connectivity portion 208-1 may include profile options for configuring edge switches to deliver the correct virtual local area networks (VLANs) to the server 204. The network connectivity portion 208-1 may include a profile option 214-1 for configuring and/or gathering data about the world-wide port names at the server 204.

A second portion 208-2 of the server profile 202 may include an operating system deployment portion 208-2. The operating system deployment portion 208-2 may include profile options for communicating with a resource manager to create a bootable volume for operating system installation to the server 204. The operating system deployment portion 208-2 may include profile options for delivering volumes to the server 204 including creating a volume and placing the volume on the server 204 to make to make it visible to the server 204.

A third portion 208-3 of the server profile 202 may include a SAN storage portion 208-3. The SAN storage portion 208-3 may include profile options for communicating with a SAN manager to configure the volumes of the storage system to be accessible by the server. The SAN storage portion 208-3 may include profile options for plumbing the fiber channel networks from the volumes to the identifiers of the server adapter ports so that they have visibility to the server 204. The SAN storage portion 208-3 may include a profile option 214-N for configuring the volumes to be accessible via the world-wide port names on the adapter across the VLAN.

A fourth portion 208-4 of the server profile 202 may include a shared storage portion 208-4. The shared storage portion 208-4 may include profile options for configuring, at a resource manager, the zoning for just a bunch of disks (JBODs) (e.g., a collection of hard disks that have not been configured to act as a redundant array of independent disks) or Serial Attached Small Computer System Interface (SAS) attached drives in addition to configuring zoning for local drives for a server 204. The shared storage portion 208-4 may include profile options for delivering raw disks to the server 204.

A fifth portion 208-N of the server profile may include an "other" configurations portion 208-5. The other portion 208-5 may include profile options for configuring adapters, configuring BIOS settings, configuring firmware, configuring boot settings, etc.

Responsive to receiving a deployment request, the server profile 202 may be analyzed. Each of the profile options and/or portions 208-1 . . . 208-N of the server profile 202 may be traced to identify dependencies between profile options 214-1 . . . 214-N. Dependent profile options 214-1 . . . 214-N may include profile options that share a dependent relationship. For example, a dependency may include a profile option, such as profile option 214-1, that generates an input or data when deployed to the server 204. For example, the deployment of profile option 214-1 for configuring and/or gathering data about the world-wide port names at the server 204 may generate the input, a world-wide port name, depended on in configuring another profile option 214-N. As such, one of the profile options, such as 214-N may be dependent on the input generate by deploying profile option 214-1 in order to successfully complete its deployment. For example, deploying the profile option 214-N may involve configuring the SAN storage system of the server 204 such that the storage volumes are accessible vie the world-wide port names on the adapter across the VLAN, which involves the world-wide port names of the server 204 gathered and generated as an input in the deployment of the profile option 214-1. That is, the world-wide port names have to be gathered through deployment of the corresponding profile option prior to being utilized in the deployment of the dependent profile option in the SAN storage portion 208-3 of the server profile 202.

The identified dependencies 214-1 . . . 214-N may be resolved. Resolution of the dependencies 214-1 . . . 214-N may include removing, modifying, generating, and/or reorganizing instructions for profile options and/or portions 208-1 . . . 208-N of the server profile 202. For example, a server profile deployment schedule 212 for the profile options and/or portions 208-1 . . . 208-N of the server profile 202 may be generated by reorganizing the instructions of the server profile 202 executable by a processing resource to cause a processing resource to deploy profile options and/or portions 208-1 . . . 208-N of the server profile 202 to the server 204. For example, resolution of the dependency 214-1 . . . 214-N may include structuring the server profile deployment schedule 212 such that the profile option 214-1 that provides the data input for the dependent profile option 214-N is extracted from the network connectivity portion 208-1 and scheduled to be deployed to the server 204 prior to the rest of the profile options 214-N and/or portions 208-1 . . . 208-N. As a result, the dependency of the profile option 214-N is a resolved dependency 214-N since the data upon which it depends is scheduled to be generated by a prior deployment and to be fed into the profile option 214-N for its deployment.

Upon resolving the dependencies, the profile options and/or portions 208-1 . . . 208-N of the server profile may be deployed to the server 204 according to the server profile deployment schedule. For example, the profile option identified as the dependency input generator 214-1 may be deployed to the server 204 first followed by a concurrent deployment 210 of the remaining profile options, including the profile option with the resolved dependency 214-N, and/or portions 208-1 . . . 208-N of the server profile 202. Concurrent deployment 210 of the remaining profile options and/or portions 208-1 . . . 208-N may include placing each of the remaining profile options and/or portions 208-1 . . . 208-N in an execution worker queue for simultaneous processing resulting in simultaneous configuration of the server components 206-1 . . . 206-N.

The server components 206-1 . . . 206-N may include physical resources, logical resources, resource managers, etc. of and/or associated with a virtualized server 204. For example, the server 204 may include physical resources, logical resources, and/or resource managers for network components 206-1 of and/or utilized by the server 204. The server 204 may include physical resources, logical resources, and/or resource managers for operating system components 206-2 of and/or utilized by the server 204. The server 204 may include physical resources, logical resources, and/or resource managers for SAN storage components 206-3 of and/or utilized by the server 204. The server 204 may include physical resources, logical resources, and/or resource managers for shared storage components 206-4 of and/or utilized by the server 204. The server 204 may include physical resources, logical resources, and/or resource managers for other components 206-N of and/or utilized by the server 204.

Figure 3:
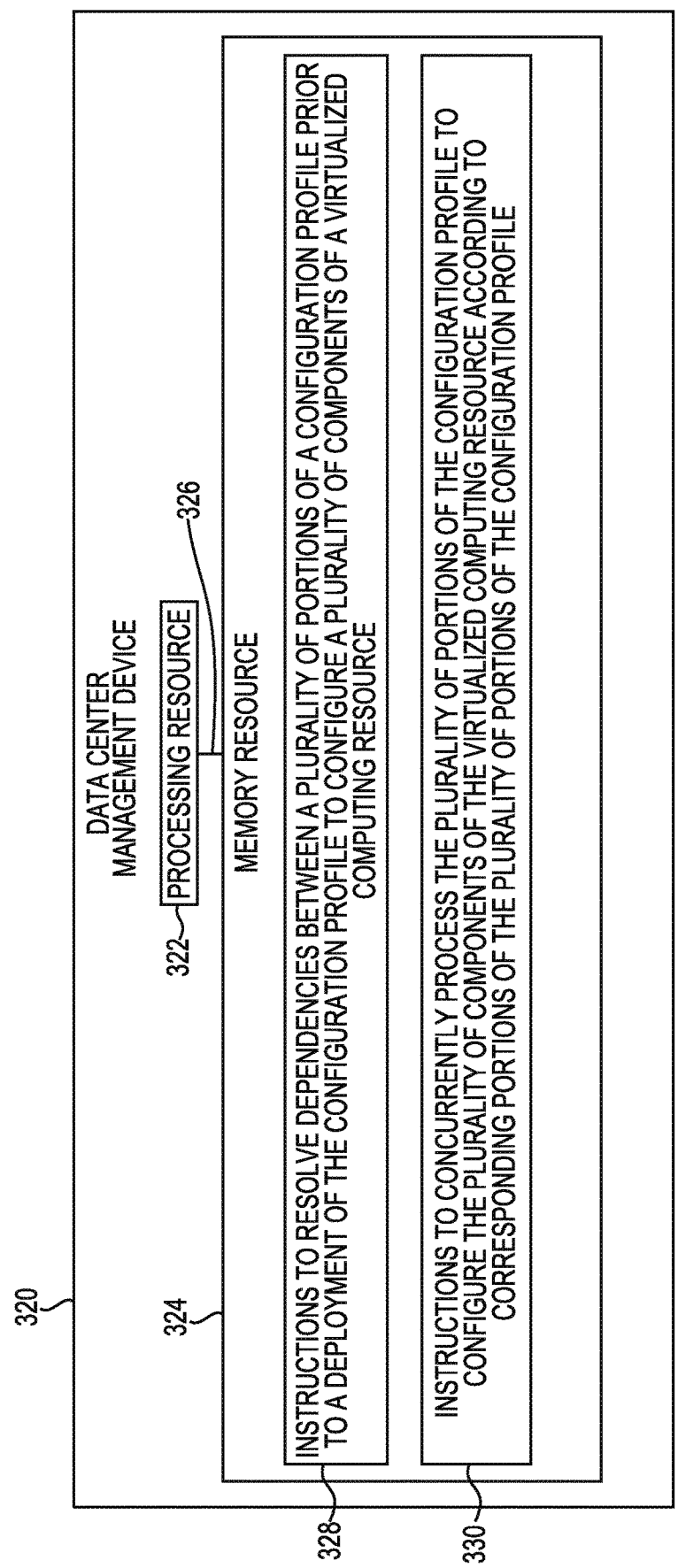
FIG. 3 illustrates an example of a data center management device consistent with the present disclosure.

FIG. 3 illustrates an example of a data center management device 320 consistent with the present disclosure. The data center management device 320 may include any of the components of and/or be utilizable to achieve any of the functionalities discussed with regard to the system 100, the system 200, the computer readable medium of claim 440, and the method 560. A data center management device 320 may include a physical device utilizable to communicate with, configure, and/or otherwise manage data center infrastructure. Examples of data center management devices 320 may include a computing device such as a management server communicatively coupled to a secure network of and/or shared by the data center. The data center management device 320 may include a combination of hardware and instructions for data center infrastructure management. The hardware, for example may include processing resource 322 and/or a memory resource 324 (e.g., MRM, computer-readable medium (CRM), data store, etc.).

Processing resource 322, as used herein, may include a number of processing resources capable of executing instructions stored by a memory resource 324. The instructions (e.g., machine-readable instructions (MRI)) can include instructions stored on the memory resource 324 and executable by the processing resource 322 to implement a desired function (e.g., data center infrastructure management). The memory resource 324, as used herein, can include a number of memory components capable of storing non-transitory instructions that can be executed by processing resource 322. Memory resource 324 can be integrated in a single device or distributed across multiple devices. Further, memory resource 324 can be fully or partially integrated in the same device as processing resource 322 or it can be separate but accessible to that device and processing resource 322. Thus, it is noted that the data center management device 320 can be implemented on an electronic device and/or a collection of electronic devices, among other possibilities.

The memory resource 324 can be in communication with the processing resource 322 via a communication link 326 (e.g., path). The communication link 326 can be local or remote to an electronic device associated with the processing resource 322. The memory resource 322 includes instructions 328, 330, etc. The memory resource 324 can include more or fewer instructions than illustrated to perform the various functions described herein. In some examples, instructions (e.g., software, firmware, etc.) 328, 330, etc. can be downloaded and stored in memory resource 324 (e.g., MRM) as well as a hard-wired program (e.g., logic), among other possibilities.

Instructions 328, when executed by a processing resource such as processing resource 322 may resolve dependencies between a plurality of portions of a configuration profile. The dependencies may be resolved prior to a deployment of the configuration profile to configure a plurality of components of a virtualized computing resource. Resolving the dependencies may involve identifying the dependencies in the configuration profile. Identifying the dependencies may include parsing the configuration profile responsive to receiving a deployment request to identify profile options in the configuration profile that are dependent on one another. For example, identifying dependencies may include identifying profile options or portions of a configuration profile that rely on a completed deployment of another profile option or portion of the configuration profile to complete a successful deployment themselves.

Once the dependencies have been identified, they may be resolved. Resolving the dependencies may include structuring the deployment of the profile options or portions of a configuration profile such that the profile options and/or portions of the configuration profile that generate data upon deployment that is relied on for successful deployment of other profile options and/or portions of the configuration profile are deployed prior to the reliant other profile options and/or portions of the server profile. Further, the remaining profile options and/or portions of the configuration profile (e.g., those profile options and/or portions whose deployment are not relied on by others and/or those profiles that rely on the generated data) may be placed into a plurality of worker execution queues for simultaneous processing resulting in concurrent deployment of the remaining profile options and/or portions of the configuration profile to the computing resource. That is, by resolving the dependencies prior to deployment of the configuration profile to the computing resource, the remaining profile options of the configuration profile are freed up for concurrent deployment to the computing resource which may speed up configuration and/or virtualization of the computing resource.

Instructions 330, when executed by a processing resource such as processing resource 322 may concurrently process the plurality of portions of the configuration profile to configure a plurality of components of a virtualized computing resource. Configuring the plurality of components of the computing resource may include configuring settings of the components according to the profile options specified in the configuration profile.

Concurrent processing may involve simultaneous processing of each of the portions of the configuration profile. The concurrent processing may be facilitated by the resolution of dependencies to include the extraction of profile options that generate depended-on data and the deployment of such profile options prior to the concurrent processing of each of the remaining portions and/or profile options of the configuration profile. That is, by deploying the profile options that generate depended-on data, the portions of the configuration profile that depend on such data for their deployment may be fed the previously collected data.

In addition, incoming events to the data center management device 320 may be concurrently processed. For example, as the profile options and/or portions of the configuration profiles are concurrently deployed to a computing resource, events may be generated in response to the deployments. For example, errors may result from the concurrent deployment of the profile options and/or portions of the configuration profiles to the computing resource. The events may be concurrently processed and/or adjustments to configurations of the computing resource may be concurrently deployed back out in response to the events.

Figure 4:
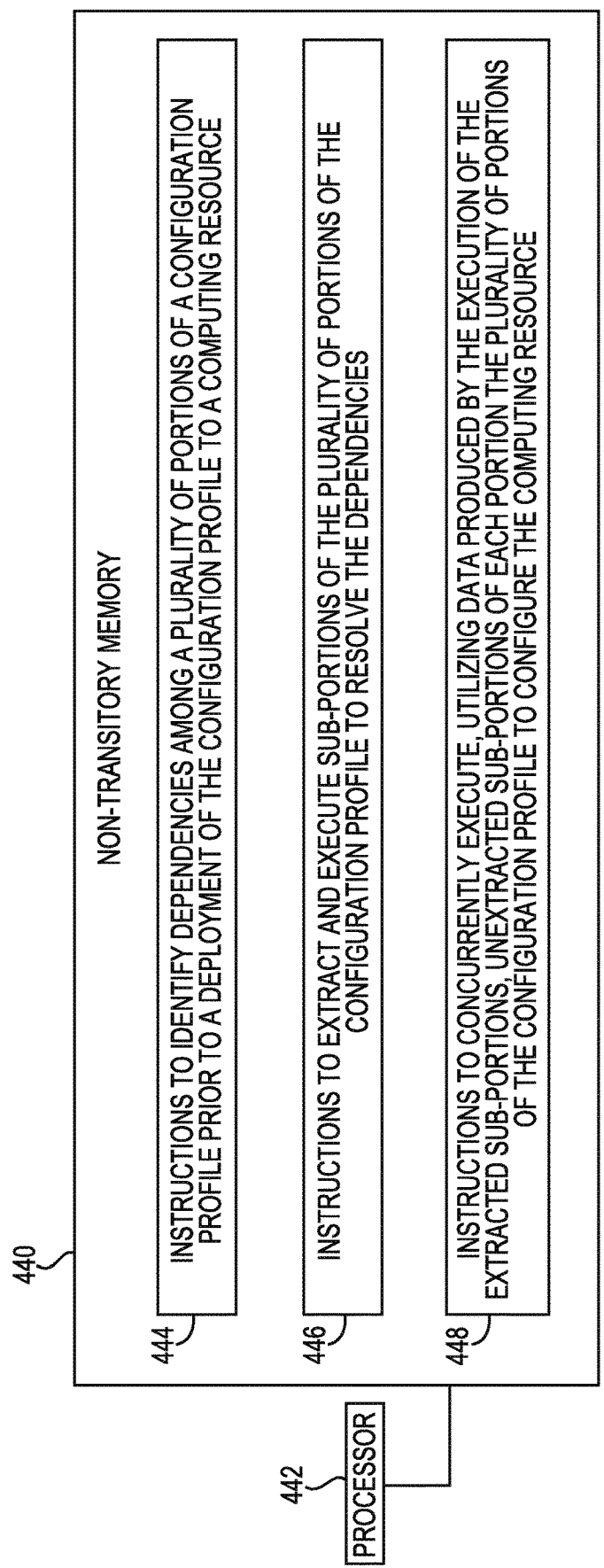
FIG. 4 illustrates an example of a non-transitory machine-readable memory resource and processing resource for concurrent server profile deployments consistent with the present disclosure.

FIG. 4 illustrates an example of a non-transitory machine-readable memory resource and processing resource for concurrent profile deployments consistent with the present disclosure. The processing resource 442, and the non-transitory memory resource 440, illustrated in FIG. 4 may be analogous to the elements illustrated in FIGS. 1, 2, 3, and 5. A memory resource, such as the non-transitory memory resource 440, may be used to store instructions (e.g., 444, 446, 448, etc.) executed by the processing resource 442 to perform the operations as described herein. The operations are not limited to a particular example described herein and may include additional operations such as those described with regard to the system 100, system 200, data center management device 320, and the method 560 described in connection with FIGS. 1, 2, 3, and 5.

The non-transitory memory resource 440 may store instructions 444 executable by the processing resource 442 to identify dependencies among a plurality of portions of a configuration profile prior to a deployment of the configuration profile to a computing resource. The configuration profile may include a logical construct that defines configurations to be applied to the physical resources, logical resource, and/or resource managers of a computing resource being virtualized and provisioned for executing a workload as part of the composable infrastructure of a data center.

The plurality of portions of the configuration profile may include a plurality of groups of configuration profile options. The plurality of portions may correspond to groups of configuration profile options that configure a corresponding group of computing resource components. For example, the configuration profile may include a server configuration profile including a plurality of portions that correspond to configurations applicable to groups of computing resource components to virtualize a server.

For example, a first portion of a configuration profile may include a network connectivity portion of the configuration profile that includes instructions to configure network connections of the computing resource. A second portion may include an operating system deployment portion of the configuration profile that includes instructions to configure an operating system deployment to the computing resource. A third portion may include a storage area network (SAN) portion of the configuration profile that includes instructions to configure a SAN of the computing resource. A forth portion may include a shared storage portion of the configuration profile that includes instructions to configure a shared storage of the computing resource. A fifth portion may include an "other" portion of the configuration profile that includes instructions to configure firmware of the computing resource, configure a BIOS setting of the computing device, configure local storage of the computing device, configure a management processor, configure a server adapter, and configure boot settings of the computing device, etc.

The dependencies between the plurality of portions of a configuration profile may be identified based on parsing the configuration profile responsive to a deployment request. The dependencies may be identified by tracing the relationships between each of the profile options in each of the portions of the configuration profile. A profile option and/or a portion of the configuration profile that depends on the completion of a deployment of another profile option and/or portion may be identified as sharing a dependency relationship to the another profile option and/or portion. The dependencies may be identified prior to the deployment of the configuration profile to the computing resource.

The non-transitory memory resource 440 may store instructions 446 executable by the processing resource 442 to extract sub-portions of the plurality of portions of the configuration profile. The sub-portions of the plurality of portions of the configuration profile may be the constituent profile options of the portions of the configuration profile. Extracting the sub-portion may include extracting the instructions to deploy the profile options from the configuration profile. For example, extracting the sub-portion may include extracting the instructions to deploy the profile option that, once deployed, generates data that is depended on by other unextracted profile options and/or portions of the configuration profile. Alternatively, extracting the sub-portion may include extracting the instructions to deploy the profile option that, once deployed, depends on the deployment of other unextracted profile options and/or portions of the configuration profile Extracting the extracted sub-portion may include scheduling the extracted instructions of the sub-portion to be deployed to the computing resource prior to the unextracted sub-portions of the server prior when the extracted sub-portion generates data depended on by an un-extracted sub-portion of the configuration profile. Alternatively, extracting the extracted sub-portion may include scheduling the extracted instructions of the sub-portion to be deployed to the computing resource subsequent to the unextracted sub-portions of the computing device prior when the extracted sub-portion depends on the deployment by an un-extracted sub-portion of the configuration profile.

As such, the dependencies between the sub-portions and/or portions of the configuration profile may be resolved. That is, by defining an execution sequence of the sub-portions and/or portions of the configuration profile, the depended upon data may be generated and/or provided in a sequence that allows for successful complete deployment of the entire configuration profile. Additionally, extracting the sub-portions involved in a dependency and scheduling their executions to resolve the dependency may allow for concurrent execution of the unextracted sub-portions. That is, by resolving the sequence dependent sub-portions of the portions of the configure profile, the unextracted configuration profile is ready for concurrent execution in a plurality of simultaneously executing worker queues, thereby speeding up the computing resource virtualization profile deployment process.

The extracted instructions of the sub-portions may be executed following extraction. Execution of the extracted sub-portions may include deploying the extracted sub-portions to a computing device by concurrently deploying the extracted sub-portions according to the schedule. For example, when execution of the extracted sub-portion generates data depended on by an un-extracted sub-portion of the configuration profile, the extracted sub-portion may be executed prior to the concurrent execution of the unextracted sub-portions. Alternatively, when the extracted sub-portion depends on the execution of an un-extracted sub-portion of the configuration profile, the extracted sub-portion may be executed subsequent to the concurrent execution of the unextracted sub-portions of the configuration profile.

The non-transitory memory resource 440 may store instructions 448 executable by the processing resource 442 to concurrently execute, the unextracted sub-portions of each portion of the plurality of portions of the configuration profile to configure a computing resource for virtualization. The unextracted sub-portions of the configuration profile may be concurrently executed utilizing the data produced by the execution of the extracted sub-portions of the configuration profile. For example, when an unextracted sub-portion of the configuration profile utilizes data from a deployment of an extracted sub-portion to the computing resource, the data generated by the deployment of the extracted sub-portion to the computing resource may be provided to the unextracted sub-portion for use in its deployment concurrent with the deployment of the other unextracted sub-portions.

The concurrent execution of the unextracted sub-portions of the configuration profile to configure the computing resource may result in events being generated. For example, configuring the computing resource according to a sub-portion may generate data and/or events including errors, confirmations, suggestions, testing results, alerts, etc. Since the unextracted sub-portions may be being concurrently deployed to the computing resource, the alerts may be being concurrently generated. As such, the concurrently generated events may be concurrently processed as they are generated. That is, each of the events may be processed by a separate worker execution queue to provide simultaneous processing of the incoming events.

Figure 5:
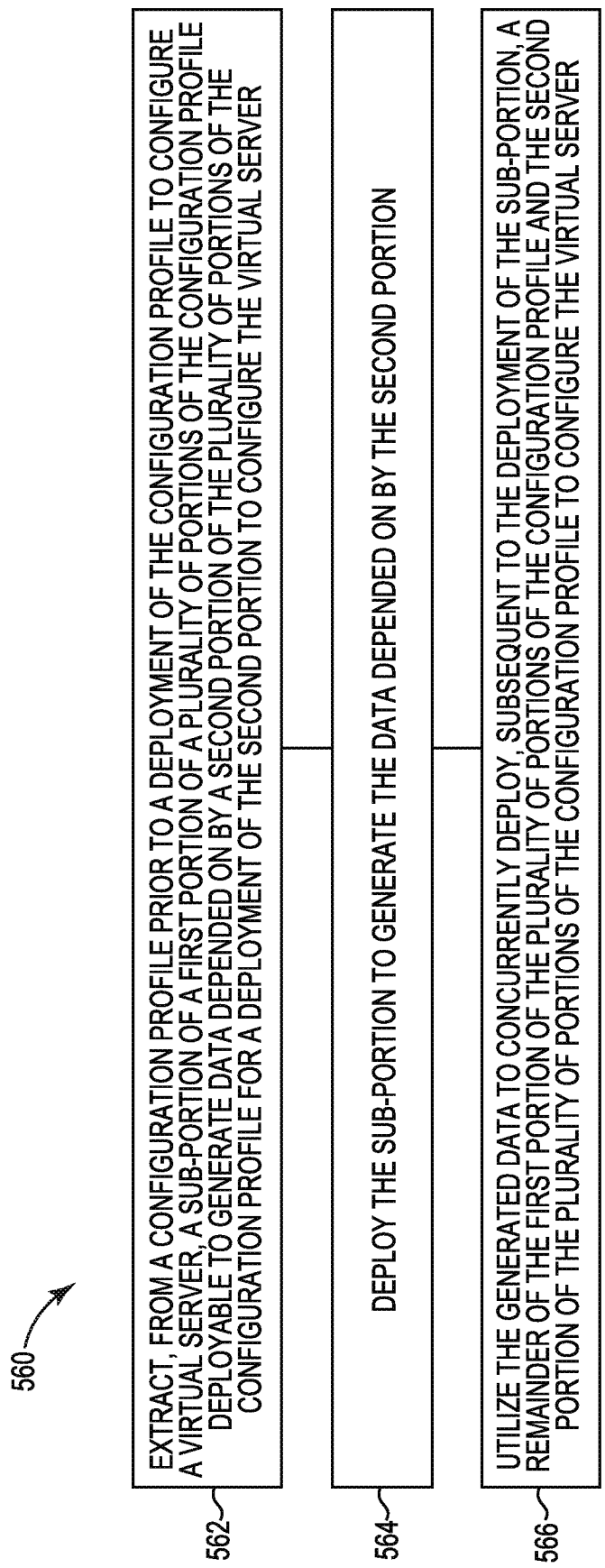
FIG. 5 illustrates an example of a method 560 for concurrent server profile deployment.

FIG. 5 illustrates an example of a method 560 for concurrent configuration profile deployment. The method 560 may be implemented by components of and/or include functionalities of the system 100, the system 200, the data center management device 320, and/or the non-transitory memory 440 described in FIGS. 1, 2, 3, and 4.

At 562, the method 560 may include extracting a first sub-portion of a first portion of a plurality of portions of a configuration profile. The first portion may include a plurality of definitions of configurations deployable to configure a virtual server. The first sub-portion may include a definition of the plurality of definitions of configurations forming the portion.

The first sub-portion may be a portion that, when executed, generates and/or supplies data that is depended on by a second portion of the plurality of portions of the configuration profile. For example, a second sub-portion of the second portion may utilize the data generated from the deployment of the first sub-portion in order to complete its deployment.

The first sub-portion may be identified for extraction by parsing a configuration profile to be deployed to a server or group of servers. By tracing the relationships between each of the sub-portions and/or each of the portions of the configuration profile, an understanding of the dependencies therebetween may be achieved. The first sub-portion to be extracted may be identified based on its provision, when deployed, of data that is utilized to complete a deployment of another sub-portion or portion of the configuration profile. In such examples, the first sub-portion may be extracted and/or schedule for deployment prior to the other sub-portion or portion that utilizes its data. Conversely, the first sub-portion to be extracted may be identified based on its utilization, when deployed, of data that is generated by a deployment of another sub-portion or portion of the configuration profile. In such examples, the first sub-portion may be extracted and/or schedule for deployment subsequent to to the other sub-portion or portion that generates the data utilized by the first sub-portion.

At 564, the method 560 may include deploying the extracted sub-portion. In some examples, deploying the extracted sub-portion may include executing the extracted sub-portion to configure the virtual server. Deploying the extracted sub-portion may include gathering and/or generating of data resulting from the deployment of the extracted sub-portion to the virtual server.

The data generated by the deployment of the extracted sub-portion of the configuration profile may include data to be utilized to complete deployment of at least one of the unextracted sub-portions and/or portions of the configuration profile. As such, the data may be gathered and/or supplied to the unextracted sub-portions and/or portions of the configuration profile that may utilize it to complete their deployment to configure the virtual server.

At 566, the method 560 may include utilizing the generated data from deployment of the extracted sub-portion to concurrently deploy a remained of the first portion of the plurality of portions of the configuration profile and a second portion of the plurality of portions of the configuration profile to the configure the various components of the virtual server. That is, the data generated by the deployment of the extracted and deployed first sub-portion of the configuration profile to configure the corresponding components of the virtual server may be provided to the unextracted sub-portions and/or portions that will utilize the data to complete their deployment. As such, the unextracted sub-portions and/or portions of the configuration profile, including those sub-portions and/or portions that depend on the data generated by the deployment of the extracted first sub-portion, may be concurrently deployed to configure the components of the virtual server instead of sequentially deployed as may be originally specified in the configuration profile or deployment request.

Concurrent deployment of the unextracted sub-portions and/or portions of the configuration profile may include deploying the unextracted sub-portions and/or portions of the configuration profile to respective worker execution queues for simultaneous processing and/or configuration of the corresponding virtual server components. For example, concurrent execution of the unextracted sub-portions and/or portions of the configuration profile may include deploying the remainder, after extraction, of the first portion and the second portion to configure the components of the virtual server by assigning the remainder of the first portion and the second portion to respective worker queues for simultaneous processing.

Further, the concurrent deployment of the unextracted sub-portions and/or portions of the configuration profile may result in the generation and/or communication of events corresponding to the deployment of each of the unextracted sub-portions and/or portions of the configuration profile. For example, virtual server components undergoing configuration by the concurrent deployment of the remainder of the first portion and the second portion of the configuration profile may generate and report events to a deployment manager. The events may be received by the deployment manager. Additionally, the events may be concurrently processed during the concurrent deployment of the remainder of the first portion and the second portion of the configuration profile to configure the components of the virtual server. As such, notifications of the concurrent processed events may be presented to a user during the concurrent deployment of the remainder of the first portion of the configuration profile and the second portion of the configuration profile to the components of the virtual server.

Concurrently deploying the unextracted sub-portions and/or portions of the configuration profile may speed up the overall deployment of a configuration profile to configure the components of a virtual server. However, concurrent deployment of the unextracted sub-portions and/or portions of the configuration profile may rely on fixed setting or definitions throughout the concurrent deployment process as to not disrupt the configuration of the virtual server by changing variables and/or introducing new dependencies within the configuration profile being applied. As such, portions of the configuration profile may be locked from being changed during the concurrent deployment. For example, portions of the remainder of the first portion of the configuration profile and the second portion of the configuration profile may be locked from being changed during the concurrent deployment of the remainder of the first portion of the configuration profile and the second portion of the configuration profile to configure the components of the virtual server.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed:

1. A system, comprising:
   a processor;
   a memory resource storing machine-readable instructions to cause the processing resource to:
   resolve dependencies between a plurality of portions of a configuration profile prior to a deployment of the configuration profile to configure a plurality of components of a computing resource; and
   concurrently process the plurality of portions of the configuration profile to configure the plurality of components of the computing resource according to corresponding portions of the plurality of portions of the configuration profile,
   wherein the dependencies include a utilization of data from a completed configuration to a first component of the computing resource, corresponding to a first portion of the plurality of portions of the configuration profile, to perform a configuration to a second component of the computing resource corresponding to a second portion of the plurality of portions of the configuration profile,
   wherein the instructions to resolve the dependencies include instructions to:
   restructure a deployment schedule of the configuration profile by performing an extraction of instructions to deploy a first sub-portion from the first portion of the plurality of portions of the configuration profile; and
   execute the extracted instructions to deploy the first sub-portion to configure the first component of the computing resource to generate the data including instructions to reserve a resource of the computing resource for utilization in configuring the second component of the computing resource, wherein the generated data further includes the identity of the reserved resource including a world-wide port name reserved for use by the second component of the computing resource.

2. The system of claim 1, wherein the instructions to resolve the dependencies include instructions to parse a request to deploy the configuration profile to identify the dependencies between the plurality of portions.

3. The system of claim 1, wherein the instructions to resolve the dependencies further include instructions to execute the extracted instructions to deploy the first sub-portion to configure the first component of the computing resource to generate the data prior to deploying a plurality of remaining portions of the configuration profile to configure remaining components of the computing resource.

4. The system of claim 3, wherein the instructions to resolve the dependencies further include instructions to provide the generated data to the second portion of the configuration profile.

5. A non-transitory machine-readable medium containing instructions executable by a processor to cause the processor to:
identify dependencies among a plurality of portions of a configuration profile prior to a deployment of the configuration profile to a computing resource;
extract and execute sub-portions of the plurality of portions of the configuration profile to resolve the dependencies; and
concurrently execute, utilizing data produced by the execution of the extracted sub-portions, unextracted sub-portions of each portion the plurality of portions of the configuration profile to configure the computing resource, wherein one portion of the plurality of portions of the configuration profile includes instructions to configure firmware of the computing resource, configure BIOS settings of the computing resource, configure local storage, configure a management processor, configure a server adapter, and configure boot settings of the computing resource.

6. The non-transitory machine-readable medium of claim 5, wherein a first portion of the plurality of portions of the configuration profile includes instructions to configure network connections of the computing resource.

7. The non-transitory machine-readable medium of claim 5, wherein a second portion of the plurality of portions of the configuration profile includes instructions to configure an operating system deployment to the computing resource.

8. The non-transitory machine-readable medium of claim 5, wherein a third portion of the plurality of portions of the configuration profile includes instructions to configure a storage area network of the computing resource.

9. The non-transitory machine-readable medium of claim 5, wherein a fourth portion of the plurality of portions of the configuration profile includes instructions to configure a shared storage of the computing resource.

10. The non-transitory machine-readable medium of claim 5, including instructions to concurrently process errors resulting from the concurrent execution of the unextracted sub-portions of each portion the plurality of portions of the configuration profile to configure the computing resource.

11. A method comprising:
extracting, from a configuration profile prior to a deployment of the configuration profile to configure a virtual server, a sub-portion of a first portion of a plurality of portions of the configuration profile deployable to generate data depended on by a second portion of the plurality of portions of the configuration profile for a deployment of the second portion to configure the virtual server;
deploying the sub-portion to generate the data depended on by the second portion;
utilizing the generated data to concurrently deploy, subsequent to the deployment of the sub-portion, a remainder of the first portion of the plurality of portions of the configuration profile and the second portion of the plurality of portions of the configuration profile to configure the virtual server, and
locking portions of the remainder of the first portion of the configuration profile and the second portion of the configuration profile from being changed during the concurrent deployment of the remainder of the first portion of the configuration profile and the second portion of the configuration profile to configure the virtual server.

12. The method of claim 11, wherein concurrently deploying the remainder of the first portion and the second portion to configure the virtual server includes assigning the remainder of the first portion and the second portion to respective worker queues for simultaneous processing.

13. The method of claim 11, including:
receiving events reported by virtual server components undergoing configuration by the concurrent deployment of the remainder of the first portion of the configuration profile and the second portion of the configuration profile; and
concurrently processing the events during the concurrent deployment of the remainder of the first portion of the configuration profile and the second portion of the configuration profile to the configure the virtual server.

14. The method of claim 12, including presenting a notification of the events to a user during the concurrent deployment of the remainder of the first portion of the configuration profile and the second portion of the configuration profile to configure the virtual server.

* * * * *